(12) United States Patent
Nogue I Arbusa et al.

(10) Patent No.: US 12,545,489 B2
(45) Date of Patent: Feb. 10, 2026

(54) POURING SPOUT FOR A FILM BAG

(71) Applicant: GEORG MENSHEN GMBH & CO. KG, Finnentrop (DE)

(72) Inventors: Marti Nogue I Arbusa, Barcelona (ES); Carlos Almor Morujo, Barcelona (ES); Frank Roemer, Finnentrop (DE)

(73) Assignee: GEORG MENSHEN GMBH & CO. KG, Finnentrop (DE)

( * ) Notice: Subject to any disclaimer, the term of this patent is extended or adjusted under 35 U.S.C. 154(b) by 126 days.

(21) Appl. No.: 18/561,296

(22) PCT Filed: May 18, 2022

(86) PCT No.: PCT/EP2022/063399
§ 371 (c)(1),
(2) Date: Nov. 16, 2023

(87) PCT Pub. No.: WO2022/243356
PCT Pub. Date: Nov. 24, 2022

(65) Prior Publication Data
US 2024/0246740 A1  Jul. 25, 2024

(30) Foreign Application Priority Data
May 20, 2021 (DE) ............... 10 2021 113 115.4

(51) Int. Cl.
*B65D 75/58* (2006.01)
*B65D 75/00* (2006.01)
(52) U.S. Cl.
CPC ....... *B65D 75/5883* (2013.01); *B65D 75/008* (2013.01); *B65D 2575/583* (2013.01)

(58) Field of Classification Search
CPC .............. B65D 75/5883; B65D 75/008; B65D 2575/583; B65D 75/5861; B65D 75/5872; B65D 75/5877; B65D 2575/58
(Continued)

(56) References Cited

U.S. PATENT DOCUMENTS 3,042,242 A  7/1962 Abt
4,691,836 A  9/1987 Wassilieff
(Continued)

FOREIGN PATENT DOCUMENTS

CL         44567 B1   7/2005
CO      03-29399     10/2003
(Continued)

*Primary Examiner* — David J Walczak
(74) *Attorney, Agent, or Firm* — Norman B. Thot

(57) ABSTRACT

A pouring spout for a film bag includes a pouring channel having a channel wall which is a pouring nozzle on top and which is surrounded by a welding region on the bottom. The welding region has welding arms which extend to respective welding arm ends. The welding arms have rib elements attached to the channel wall and are axially spaced apart from each other. The rib elements have welding sides having peripheral regions extending between the channel wall and the welding arm ends. The peripheral regions form welding zones which converge towards the welding arm ends. Vacant spaces are arranged in the welding arms between each of two adjacent rib elements. The vacant spaces are open on one of the two welding sides and are closed by a welding face on the other of the two welding sides.

19 Claims, 15 Drawing Sheets

(58) Field of Classification Search
USPC .................................. 222/567, 566, 569, 572
See application file for complete search history.

(56) References Cited

U.S. PATENT DOCUMENTS

| | | | |
|---|---|---|---|
| 4,998,646 A | 3/1991 | Sherman | |
| 5,823,383 A | 10/1998 | Hins | |
| 6,050,451 A | 4/2000 | Hess et al. | |
| 6,439,429 B1* | 8/2002 | Gross | B65D 75/5883 222/153.02 |
| 6,598,808 B1 | 7/2003 | Garcia et al. | |
| 6,612,466 B1 | 9/2003 | Malin | |
| 7,850,044 B2 | 12/2010 | Hildebrand et al. | |
| 2004/0146224 A1 | 7/2004 | Piotrowski et al. | |
| 2004/0245286 A1 | 12/2004 | Lee | |
| 2007/0012644 A1 | 1/2007 | Uytterhaeghe et al. | |
| 2007/0205202 A1 | 9/2007 | Hildebrand et al. | |
| 2008/0073348 A1 | 3/2008 | Pritikin et al. | |
| 2009/0020494 A1 | 1/2009 | Seelhofer | |
| 2009/0095369 A1 | 4/2009 | Murray | |
| 2009/0255626 A1 | 10/2009 | Murray | |
| 2011/0062192 A1 | 3/2011 | Gruber | |
| 2013/0319970 A1 | 12/2013 | Sugawara et al. | |
| 2014/0110433 A1 | 4/2014 | Schick | |
| 2014/0185962 A1 | 7/2014 | Sanfilippo et al. | |
| 2015/0251846 A1 | 9/2015 | Rasmussen | |
| 2015/0274391 A1 | 10/2015 | Tsuruta et al. | |
| 2015/0353242 A1* | 12/2015 | Santarelli | B65D 43/163 383/42 |
| 2017/0088318 A1 | 3/2017 | Franca et al. | |
| 2018/0022531 A1 | 1/2018 | Gately et al. | |
| 2018/0201415 A1 | 7/2018 | Berge | |
| 2018/0273268 A1* | 9/2018 | Franca | B29C 66/114 |
| 2018/0280235 A1 | 10/2018 | Franca et al. | |
| 2019/0084735 A1 | 3/2019 | Berge | |
| 2019/0256268 A1 | 8/2019 | Brown et al. | |
| 2019/0291933 A1 | 9/2019 | Nunez et al. | |
| 2020/0255203 A1 | 8/2020 | Roemer | |
| 2021/0228451 A1 | 7/2021 | Mayne et al. | |
| 2022/0242624 A1 | 8/2022 | Ahn | |

FOREIGN PATENT DOCUMENTS

| | | |
|---|---|---|
| DE | 10 2005 006 871 A1 | 5/2006 |
| DE | 20 2015 009 097 U1 | 12/2016 |
| DE | 10 2017 009 693 A1 | 4/2019 |
| EP | 1 897 815 A2 | 3/2008 |
| EP | 2 251 655 A1 | 11/2010 |
| FR | 2.224.364 | 10/1974 |
| JP | 2002-521283 A | 7/2002 |
| JP | 2004-175364 A | 6/2004 |
| JP | 2005-516850 A | 6/2005 |
| KR | 2002-0075761 A | 10/2002 |
| WO | WO 2010/069432 A1 | 6/2010 |
| WO | WO 2011/045329 A1 | 4/2011 |
| WO | WO 2013/053651 A1 | 4/2013 |
| WO | WO 2014/103574 A1 | 7/2014 |
| WO | WO 2014/184341 A1 | 11/2014 |
| WO | WO 2019/219232 A1 | 11/2019 |
| WO | WO 2019/219235 A1 | 11/2019 |
| WO | WO 2019/238773 A1 | 12/2019 |
| WO | WO 2020/222467 A1 | 11/2020 |

* cited by examiner

POURING SPOUT FOR A FILM BAG

CROSS REFERENCE TO PRIOR APPLICATIONS

This application is a U.S. National Phase application under 35 U.S.C. § 371 of International Application No. PCT/EP2022/063399, filed on May 18, 2022 and which claims benefit to German Patent Application No. 10 2021 113 115.4, filed on May 20, 2021. The International Application was published in German on Nov. 24, 2022 as WO 2022/243356 A1 under PCT Article 21(2).

FIELD

The present invention relates to a pouring spout for a film bag, comprising a pouring channel, wherein the channel wall of the pouring channel at the first end region is configured as a pouring nozzle; and the channel wall on the second end region is surrounded by a welding region; wherein the welding region has two welding arms, which extend in opposite directions perpendicular to the channel axis of the pouring spout to a respective welding arm end, in particular which extend away from the channel wall in the second end region; and each welding arm has a plurality of rib elements which are attached to the channel wall of the second end region and are mutually spaced apart in the direction of the channel axis; and each rib element on a first welding side has a first peripheral region extending between the channel wall and the welding arm end, and on a second welding side has a second peripheral region extending between the channel wall and the welding arm end; wherein the first and the second peripheral regions form first and second welding zones. First and second peripheral regions, or first and second welding zones, respectively, here converge in the direction toward the welding arm end.

In one potential embodiment, the peripheral regions/welding zones can at least partially extend in a rectilinear manner. In such a case, the regions extending in a rectilinear manner of the first peripheral region and the second peripheral region enclose therebetween an acute angle.

BACKGROUND

Such pouring spouts are described in the prior art, for example, in DE 10 2017 009 693 A1 where the pouring spouts are provided to be welded between two film layers of a film bag which contains, for example, a foodstuff, in particular a free-flowing foodstuff. As a result of the converging shape of the peripheral regions that form the welding zones in the two welding arms, the welding region has a design which from the channel axis tapers in the direction toward the welding arm ends, the design in particular also being referred to as boat-shaped, wherein the tapering takes place in a plane perpendicular to the channel axis.

Welding between the welding zones and the respective film layer on each of the two welding sides takes place via welding energy which is applied by welding jaws to the welding zones through the respective film layer of the film bag from two opposite welding sides.

The welding can take place, for example, by thermal or inductive or ultrasonic means, and other suitable welding methods.

The welding sides are thus two mutually opposite sides on the welding region. The welding sides lie on both sides of a plane which comprises the channel axis and both welding arm ends. The channel axis here is the axis of longitudinal extent of the pouring channel that leads through the pouring spout.

This plane can also be referred to as a frontal plane and corresponds to a plane which lies parallel to the film layers of the film bag, in particular the non-filled film bag. The observer actually sees the frontal plane when viewing the film bag from the front.

Disposed on the one end region which in use, in the case of a film bag standing upright, forms the upper end region in the function of the latter as a pouring nozzle, is typically a removable closure, for example, a cap, which can, for example, be fastened, or which is able to be fastened, to the pouring nozzle and which can be removed therefrom via a threaded connection.

The second end region, which forms the welding region, is the lower end region of the pouring spout in the mentioned use. A radially projecting collar about the channel wall can be disposed between the pouring nozzle and the welding region in the prior art and, for example, also in the present invention. The projecting collar can serve as a stop for a cap and/or comprise functional component parts of a so-called originality protection, via which it can be indicated whether the cap has already been opened, or at least whether the cap has been moved out of the originally closed position.

The rib elements can, for example, be configured as planar elements. These are in particular understood to be elements which have two faces which are spaced apart by a thickness value, wherein the thickness can, for example, be less than the cross-sectional dimension of the two faces which can, for example, be mutually opposite in the thickness direction. The thickness of such a planar element can be identical overall, but this is not mandatory for the present invention. The thickness may also differ locally.

The rib elements by way of the peripheral regions thereof form the welding zones which have been mentioned at the outset and run parallel to the upper periphery of a film bag and thereby, once welded, provide that the film bag at this upper periphery has a plurality of linear fastenings and seals along the welded welding region.

During welding, the rib elements are impinged with forces that act parallel to the rib plane. In order to prevent that the rib elements under the effect of these forces yield by bulging, the prior art usually provides that the rib elements are stabilized by a wall that connects all rib elements, for example, where the wall is disposed about the aforementioned plane, or frontal plane. As a result, the wall runs so as to be centric and perpendicular to the rib elements, as a result of which two vacant spaces which are disposed on both sides of the separation wall result in each case between two adjacent rib elements.

Such pouring spouts are commonplace in the market, are easy to produce, for example, via an injection-molding method, are easy to weld, and only require a small input of material, however, they have the disadvantage that the substantially linear welding zones may fail when excessively stressed, which potentially leads to leakages. While solutions which provide very large welding faces, in particular across the entire height of the welding region (when viewed in the direction of the channel axis) have previously been described, these solutions do, however, require significantly more material.

SUMMARY

An aspect of the present invention to provide a pouring spout of the type mentioned above which is easy to produce via the injection-molding method, is in particular easy to demold, and which provides an enlargement of the face on the welding region that can be used for welding without or only insignificantly increasing the material input, in particular while at the same time offering a sufficient stability of the available welding faces in relation to the forces acting during the welding procedure.

In an embodiment, the present invention provides a pouring spout for a film bag. The pouring spout includes a pouring channel which comprises a channel axis, a first end region, a second end region and a channel wall which is configured as a pouring nozzle at the first end region and which is surrounded by a welding region at the second end region, and the welding region. The welding region comprises a first welding arm and a second welding arm which are arranged to extend in opposite directions perpendicular to the channel axis of the pouring channel and away from the channel wall to a first welding arm end and to a second welding arm end, respectively. Each of the first welding arm and the second welding arm comprises a plurality of rib elements which are attached to the channel wall and which are mutually axially spaced apart from each other with respect to the channel axis. Each of the plurality of rib elements comprises two welding sides which comprises a first welding side and a second welding side. The first welding side has a first peripheral region which extends between the channel wall and the first welding arm end, and a second welding side has a second peripheral region which extends between the channel wall and the second welding arm end. The first peripheral region and the second peripheral region each form a first welding zone and a second welding zone which converge towards the first welding arm end and the second welding arm end, respectively. Vacant spaces are arranged in the first welding arm and the second welding arm between each of two adjacent rib elements of the plurality of rib elements. Each of the vacant spaces are open on one of the two welding sides and are closed by a welding face on the other of the two welding sides.

BRIEF DESCRIPTION OF THE DRAWINGS

The present invention is described in greater detail below on the basis of embodiments and of the drawings in which.

DETAILED DESCRIPTION

Figure 1:
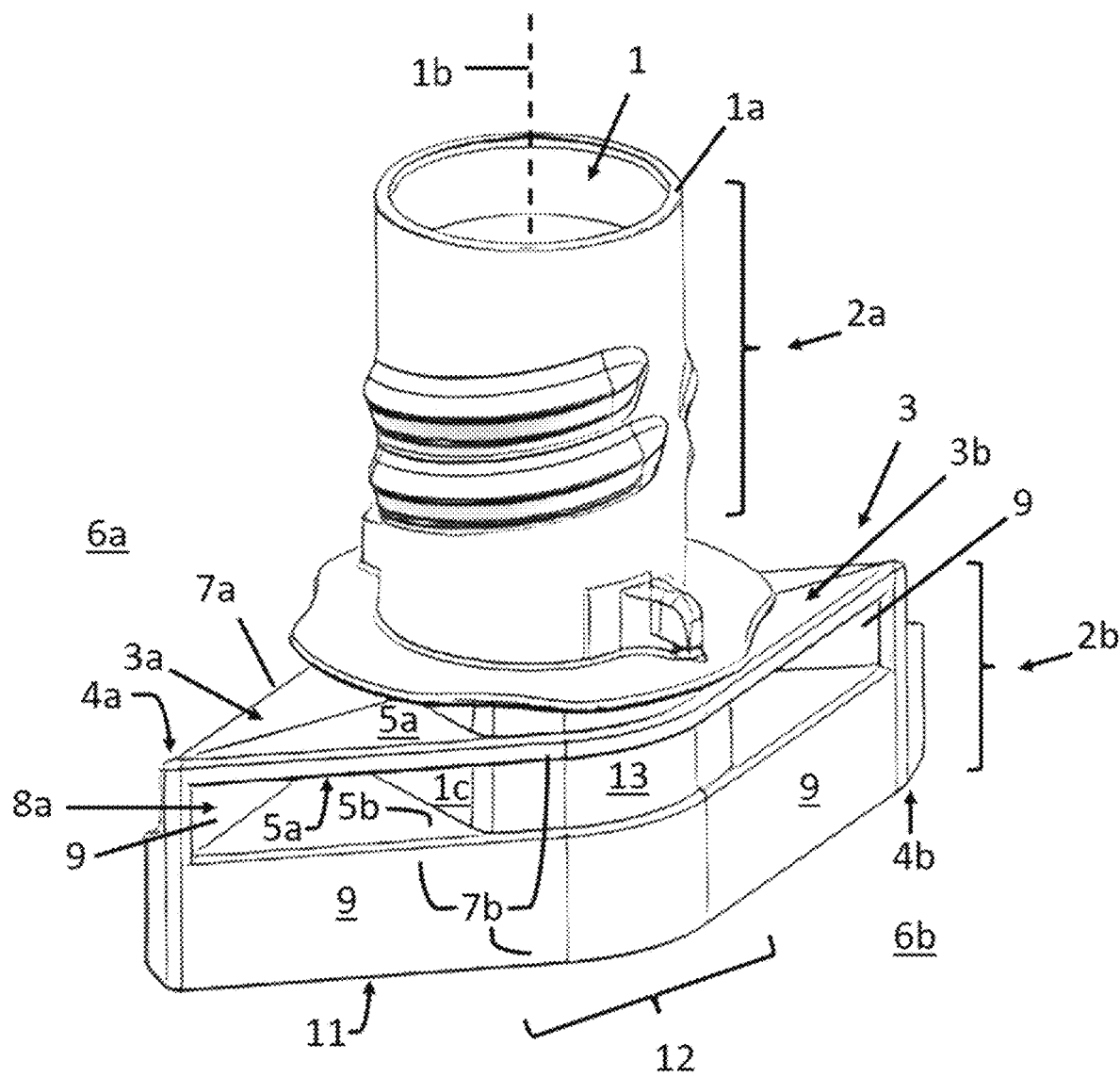
FIG. 1 shows a perspective view of a first embodiment of the pouring spout for a film bag of the present invention which highlights that the peripheral regions, or the welding zones, converge in the direction toward the welding arm end which in particular results in a boat-type design of the welding region.

The present invention provides that in each welding arm, a single vacant space is configured in each case between two adjacent rib elements, and each vacant space is open on one of the two welding sides, in particular open toward the outside, and is closed by a welding face on the other of the two welding sides.

When viewed in the direction of extent of the channel, such an embodiment in each welding arm has at least two vacant spaces which are adjacent, in particular adjacent below one another, in particular when a respective welding arm has at least three rib elements which are disposed so as to be adjacent at a spacing. One embodiment provides, for example, that each welding arm has exactly three rib elements and as a result, exactly two vacant spaces result in each welding arm.

As opposed to the prior art described above, the above-described stabilizing wall which is centric in relation to the rib elements is dispensed with. The stabilizing of two adjacent rib elements is instead achieved in that the welding zones of the latter, thus the peripheral regions of the latter, which in the direction of extent of the channel lie at least substantially on top of one another, are connected by a welding face. Such a welding face thus extends between the welding zones of those two rib elements that surround the vacant space, and additionally to the stabilizing function enlarges the overall face available for welding. As opposed to the linear connection of the prior art, this imparts the welding with a higher load bearing capability while at the same time providing the stability of the rib elements.

The substantial advantage of the present invention is that an enlargement of the overall welding face results compared to the prior art, for example, without more, or at least not substantially more, plastics material having to be used in the injection-molding process therefor.

The embodiment according to the present invention in terms of construction can be interpreted so that the originally present wall, described at the outset, from the center between the previous welding zones, has been partially displaced in the direction toward the first welding side and partially in the direction toward the second welding side, and the displaced wall region thereafter in each case forms one welding face. The welding faces can thereby, for example, be formed from the proportion of material that in the prior art has been occupied by the wall described.

An embodiment of the present invention provides that each welding arm has at least one vacant space, in particular exactly one single vacant space, which is open on the first welding side and is closed on the second welding side, and has at least one vacant space, in particular exactly one single vacant space, which is closed on the first welding side and is open on the second welding side.

This can, for example, result in an embodiment in which the welding region on the first welding side is not configured identically to the second welding side, which represents a substantial difference compared to the prior art. The at least one welding face, for example, the exactly one welding face that closes a vacant space on the first side, in this embodiment can, for example, be disposed so as to be offset in terms of the height (when viewed in the direction of extent of the channel) in relation to the at least one, for example, exactly one single welding face on the other welding side. In an analogous manner, such an offset likewise results in the case of the at least one opening of the vacant spaces on the mentioned welding sides, in particular by way of which the vacant spaces are open toward the outside. Such an opening is subsequently obscured by a film layer which is fastened to the welding region about the opening.

This embodiment also provides a positive demolding capability during injection-molding because molding protrusions on the injection-molding tool, which define the vacant spaces, can be moved in a direction perpendicular to the aforementioned frontal plane when opening and closing the injection-mold.

The present invention can provide that the two welding arms in the respective geometry thereof, in particular thus the relative mutual disposal of open vacant spaces and closed vacant spaces, are configured so as to be the same or identical on one and the same welding side, and in particular thus differ only on different welding sides.

Independently of the number of rib elements and the vacant spaces formed therebetween, the present invention can, for example, provide that vacant spaces which lie so as to be adjacent, in particular adjacent below one another, in the direction of the channel axis are alternatingly closed or open toward the first and toward the second welding side.

As a result, when viewed in a first section plane through a welding arm perpendicular to the direction of the spacing of the welding arm ends, the rib elements and the welding faces that close a vacant space can, for example, have a meandering profile. The section plane which is perpendicular to the direction of the spacing of the welding arm ends can, for example, lie at a spacing from the channel axis, in particular so that the section plane lies outside the pouring channel. This results in a very stable construction with an enlarged welding face.

The welding face which closes a vacant space between the rib elements on the one or alternatively on the other welding side is disposed so that the face of the welding face that points outward and thus comes into contact with the film layer to be welded, lies in alignment with the peripheral regions of the rib elements that form the welding zones. It is thereby provided that the welding face and the welding zones of the peripheral regions adjacent thereto on both sides are unified so as to form a conjointly acting face which is available for welding.

It can, for example, be provided that the welding face that closes a vacant space has a wall thickness which is less than or equal to the wall thickness of the adjacent rib elements, in particular which is at least smaller than the wall thickness of a rib element at the thickest location of the latter. This also contributes toward savings in terms of material without compromising the welding capability.

A vacant space thereby extends, for example, from the opening on one of the welding sides, the opening being delimited at the top and the bottom by the peripheral regions of the rib elements, in the direction perpendicular to the frontal plane into the welding arm up to the internal face of the welding face on the opposite welding side. At the respective welding arm end, the opening can be delimited by a thickening which extends in the direction of the channel axis and is disposed on the inside on the opposite welding face.

In each welding arm, the welding zones of the rib elements, the at least one welding face that closes a vacant space, in particular also the aforementioned thickening, on one welding side, for example, lie in the same plane, a welding plane, in which the welding takes place. This plane may or may not be parallel to the channel axis. In one potential, not parallel, embodiment, the welding plane can depart downward from the channel axis or approach the channel axis from below.

The present invention can provide that the face regions which contact a film layer during welding can have different surface embodiments, in particular depending on the welding method used. The contacting faces can, for example, be at least the surfaces of the peripheral regions or the welding zones of the welding faces closing a vacant space, and of a shell face region which surrounds the channel axis and connects the surface regions of the welding arms.

These contacting surfaces can be configured to be smooth, for example, in particular without a structure, for example, in the case of a conductive introduction of welding energy.

In another embodiment of the present invention, these contacting surfaces can also be configured so as to be rough, in particular with a structure, the latter being of a kind, for example, which as a result of the structure, such as protrusions, for example, provides initial points for fusing, for example, during ultrasonic welding.

A structure can be disposed so as to be raised, for example, within a specific dimensional range, in particular of 0.02 to 0.05 mm, on the contacting surface.

It can, for example, be provided that a respective vacant space from the welding side, on which the vacant space is closed by a welding face, widens in the direction toward the welding side on which the vacant space is open, in particular in the height direction, thus the direction of the spacing of the rib elements. A widening of the vacant space in the direction of the spacing of the welding arm ends can, for example, already be provided in that the welding arms taper in the direction toward the welding arm ends. A particularly easy demolding capability between the produced pouring spout and the mold protrusions on the injection mold that define the vacant spaces is thereby achieved.

An embodiment of the present invention provides that each of the rib elements is disposed about a transversal plane which is perpendicular to the channel axis. The transversal plane and the frontal plane mentioned at the outset can, for example, be mutually perpendicular. The transversal planes of different rib elements are thereby mutually spaced apart.

In this embodiment it can furthermore, for example, be provided that the face of a rib element that points into the vacant space is inclined in relation to the transversal plane about which the rib element is disposed. The aforementioned widening of the vacant space in the direction toward the open side thereof can thereby be achieved, and the demolding capability can be facilitated.

A further embodiment of the present invention provides, for example, that configured on the rib element that is closest to the second end of the pouring channel, thus in particular the lowermost rib element, is a collar which enlarges the welding zones/peripheral regions of this rib element and points away from the rib element. Since the lowermost rib element therebelow has no further adjacent rib element, the welding zone of the lowermost rib element would be restricted to the thickness of the peripheral region thereof.

The integrally molded collar extends downward so as to be aligned with the welding zone. The welding zone of the rib element can, for example, be at least enlarged substantially by the height of the collar, the rib element thus being in particular thickened in a downward manner on the periphery. This leads to an improved load bearing capability of the welded connection between the welding region and the film layer exactly at the location where the largest movement between the film layer and the welding region is present during use.

The collar can form an elastically resilient region which can prevent stretching of the film in this region during welding.

The collar on the lower periphery thereof, which points outward, can, for example, have a chamfer, or to be embodied so as to be radiused. This can also keep stress away from the film.

It can also be provided, for example, that the thickness, when viewed in the direction of the channel axis, of at least one rib element, for example, of all rib elements, in particular only on one or on both sides of the transversal plane, increases in the direction toward the welding arm end, and/or the height of a vacant space, when viewed in the direction of the channel axis, between two rib elements decreases in the direction toward the welding arm end.

It is thereby achieved that the effectively acting welding face increases in the direction toward the welding arm end. When viewed in a projection of the welding faces in the direction perpendicular to the frontal plane, an enlarged overlap of the two welding faces disposed so as to be mutually offset on the two welding sides also results in the region of the welding arm ends. This results in an improved load bearing capability of the welding at the welding arm end.

Vacant spaces which in terms of the position thereof with respect to the channel axis viewed in the direction of the channel axis are identically disposed in both welding arms can, for example, be closed or open toward the same welding side.

Two identically disposed vacant spaces, across the shell face region of the second end region that extends between the two welding arms, can, for example, be connected via a groove. The height of the groove measured in the direction of the channel axis can, for example, correspond to the height of the vacant spaces in the same direction.

The present invention can also provide, however, that this shell face region is configured without a groove, the shell face region at the height level of two vacant spaces in the different arms in particular having a curved face profile, the latter corresponding to the face profile between the welding faces of both welding arms on the same welding side that close vacant spaces.

A constructive design embodiment furthermore provides that in the welding region, the pouring channel has two mutually parallel planar/flat channel wall regions which lie so as to be mutually opposite about the channel axis and to which the rib elements of the two welding arms are attached. The planar flat shape is thus present at least on the side of the channel wall that is adjacent to the rib elements. The planar flat face of the channel wall thus points into a vacant space. The demolding during injection-molding can, for example, take place in a direction parallel to this face. The channel wall radially inward toward the channel axis can also be configured other than planar, while the channel wall can, for example, here be configured in the exact same manner.

The pouring channel in the welding region between the two mutually parallel, mutually opposite channel wall regions can have a plurality of reinforcement ribs which from the channel wall internal face extend radially inward. The channel wall internal face between the parallel, planar channel wall regions can have a curved profile, in particular having a fixed radius in relation to the channel axis.

Further embodiments which can be combined with all previously mentioned embodiments will be described hereunder.

It can, for example, be provided that the welding faces that close a vacant space are disposed so as to project outward in relation to at least one peripheral region of the rib elements that is contiguous to the welding faces, for example, in relation to both peripheral regions of the rib elements that are contiguous to the welding faces.

Such a projecting welding face can, for example, be provided at least in regions, in particular at least in the region extending from the shell face region of the second end region to the welding arm end, be configured so as to be planar, or has a curvature running in the direction of the spacing of the peripheral regions, in particular an outwardly bulging curvature. Such a curvature can, for example, be present in a plane which is oriented so as to be perpendicular to the direction of extent of peripheral regions of the rib elements that extend in a rectilinear manner.

Such projecting welding faces can form, for example, a welding material supply which is compressed during welding, in particular up to the peripheral regions.

One embodiment can also provide that the welding faces that close a vacant space are disposed so as to be aligned with at least one peripheral region of the rib elements that is contiguous to the welding faces, for example, so as to be aligned with both peripheral regions of the rib elements that are contiguous to said welding faces.

It can be provided in the welding faces that are disposed in alignment, as well as in the welding faces that project beyond the peripheral regions, that the welding faces and/or peripheral regions, at least in the region extending from the shell face region of the second end region to the welding arm end, are configured so as to be planar, or have a curvature running in a plane perpendicular to the channel axis. Such a curvature can be configured so that the welding faces and peripheral regions in the observed plane are configured so as to be concave toward the outside or convex toward the outside.

Embodiments of the present invention will be described in greater detail below under reference to the drawings.

FIGS. 1 to 4 show a first embodiment which, with the exception of differences which are subsequently addressed, shares common features with all other embodiments of the drawings, the features not being described again in the context of the later drawings. The drawings in each case show the features according to the present invention in different views.

The common features are as follows:

The pouring spout illustrated has a pouring channel 1 which has a direction of longitudinal extent according to the channel axis 1b, the channel wall 1a of the pouring channel 1 in an upper end region 2a being configured at least substantially with a circular-cylindrical cross section and forming the pouring nozzle 1.

The channel wall 1a in the upper end region 2a externally supports an external thread which interacts with a cap with a corresponding internal thread (which is not shown and which is irrelevant to the present invention) so that the pouring nozzle 1 can be selectively closed or open. The pouring nozzle 1 is the region that can be covered by the cap and from which the content of a film bag (which is also not shown in the drawings) can be retrieved.

The channel wall 1a in the lower end region 2b is surrounded by a welding region 3 which comprises two welding arms 3a, 3b. In this region, the surrounded channel wall 1a need not correspond to the circular-cylindrical shape which can be seen in the upper end region 2a.

The welding region 3 comprises two welding arms 3a, 3b which are disposed so as to be diametrically opposite about the channel wall 1a/the channel axis 1b and which extend in opposite directions away from the channel axis 1b/the channel wall 1a. One film layer of a film bag is in each case welded to the welding arms 3a, 3b on two mutually opposite sides 6a, 6b so that the welding region 3 is enclosed between the film layers. The welding sides 6a, 6b lie on both sides of an imaginary frontal plane which comprises the channel axis 1b and both welding arm ends 4a, 4b. The frontal plane thereby lies so as to be centric in the pouring spout and is parallel to the film layers (not shown) of a film bag.

Figure 3:
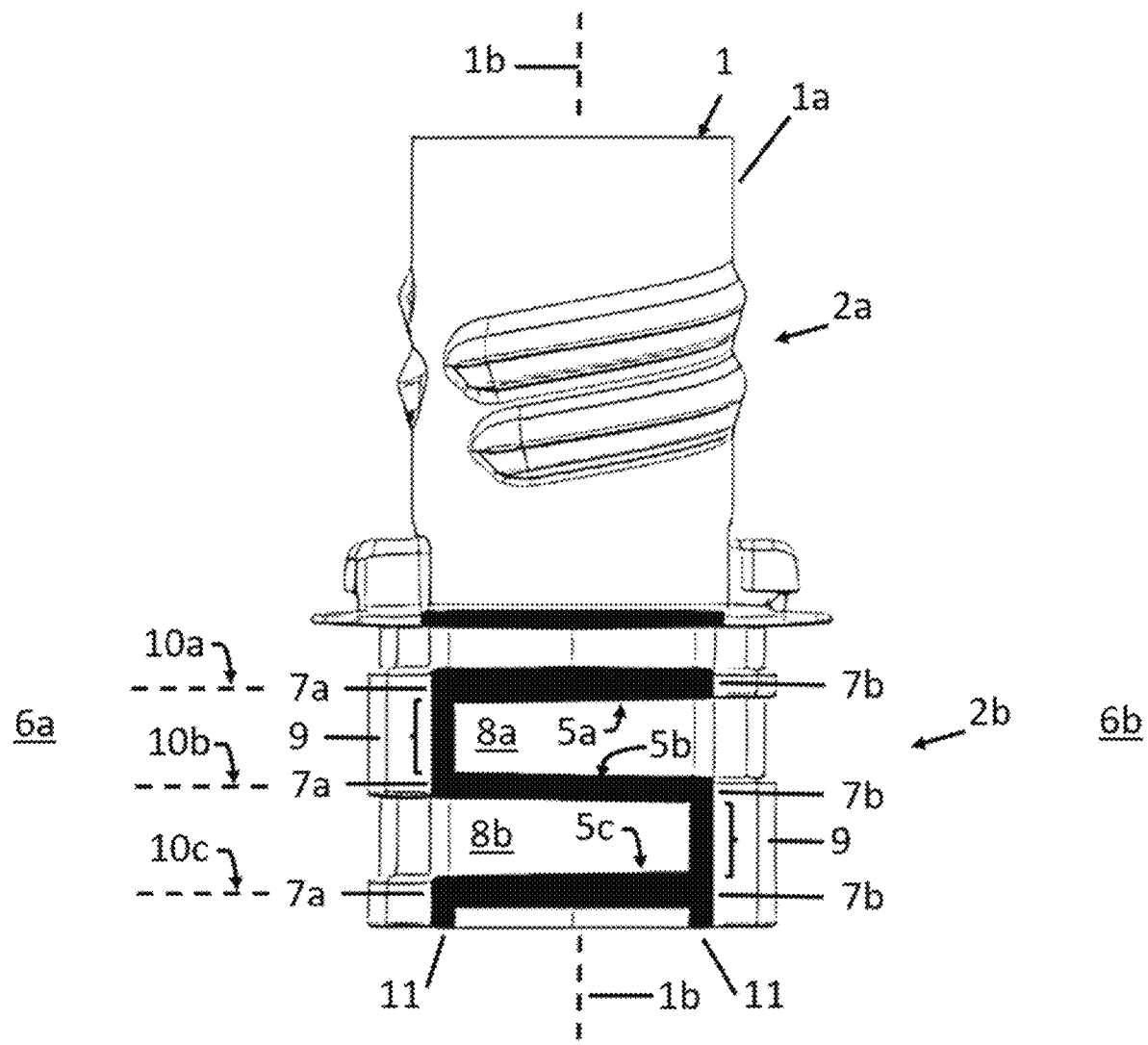
FIG. 3 is a sectional illustration which in particular highlights that each rib element on both welding sides has in each case one respective peripheral region.
Figure 4:
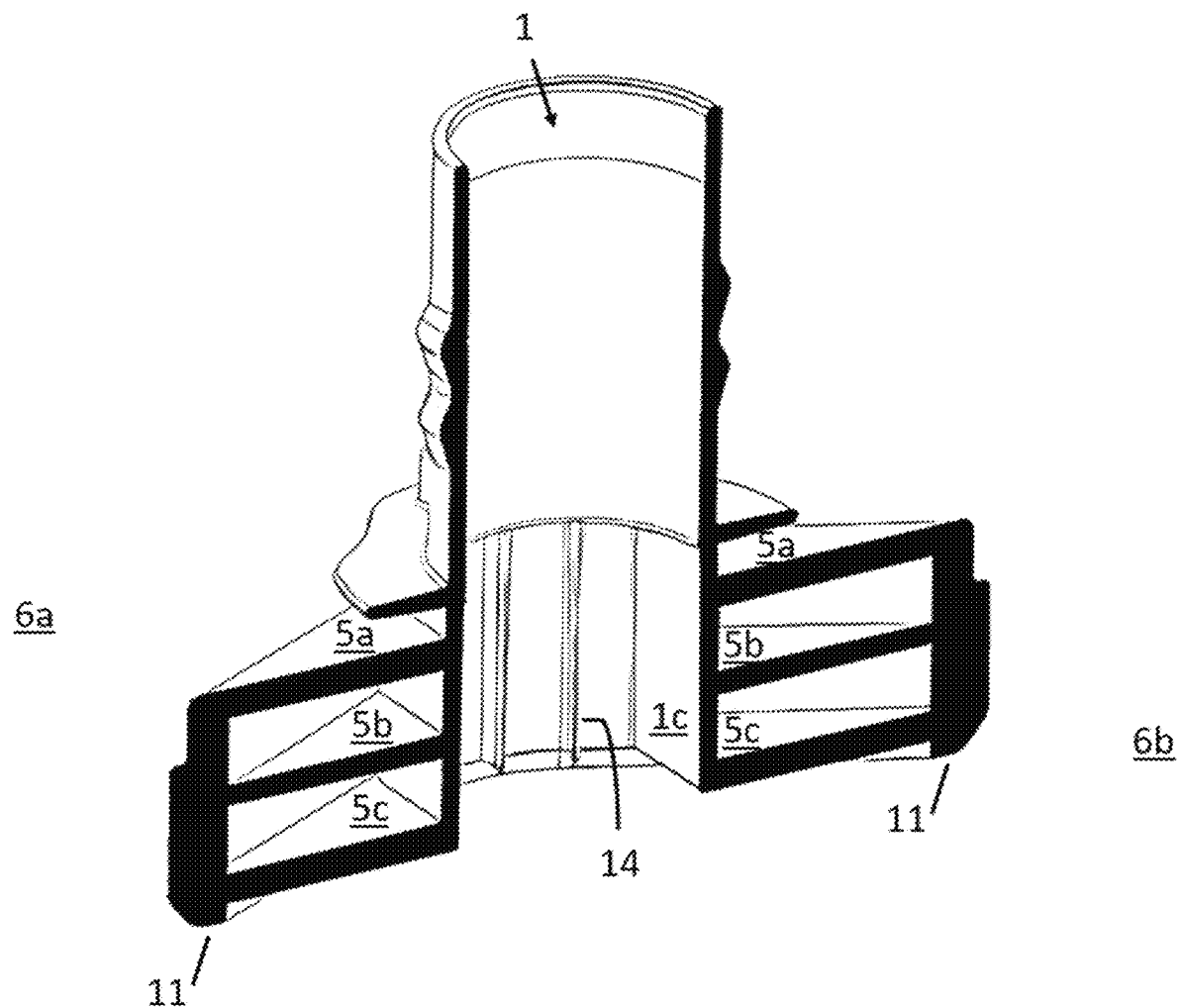
FIG. 4 highlights that the rib elements are integrally attached to the channel wall in the lower end region.

The sectional illustrations of FIGS. 3 and 4 in particular highlight that each welding arm 3a, 3b comprises a plurality of, here three, rib elements 5a, 5b, 5c. The potential embodiments are not restricted to the three rib elements shown. More than three rib elements can in particular also be provided, this merely extending the embodiment towards the bottom in an analogous manner. The rib elements can, for example, be configured as planar elements and extend in each case about a transversal plane 10a, 10b, 10c which is perpendicular to the channel axis 1b. The rib elements 5a, 5b, 5c, or the transversal planes 10a, 10b, 10c, thereof, are spaced apart in the direction of the channel axis 1b.

In the height direction, which corresponds to the direction of the channel axis 1b, two adjacent rib elements 5a and 5b, or 5b and 5c, enclose in each case one vacant space 8a and 8b. This respective vacant space 8a, 8b occupies the region of spacing between the mutually facing faces of the rib elements 5a, 5b, 5c; the respective vacant space 8a, 8b thus in particular lie in the interior of each one of the welding arms 3a, 3b. The vacant spaces 8a, 8b in both welding arms 3a, 3b have the same relative position in relation to the channel axis 1b.

The sectional illustration of FIG. 3 in particular highlights that each rib element 5a, 5b, 5c on both welding sides 6a, 6b has in each case one peripheral region 7a or 7b, respectively. The peripheral region 7a, 7b on the outer periphery extends substantially across the height (when viewed in the direction of the channel axis 1b) of the rib element 5a, 5b, 5c. This peripheral region 7a, 7b, in particular the end face thereof that points outward, forms a welding zone which solely or with enlarged faces serves for welding to a film layer. The perspective view of FIG. 1 highlights that the peripheral regions 7a, 7b, or the welding zones, converge in the direction toward the welding arm end 4a, 4b. This in particular results in a boat-type design of the welding region 3.

FIG. 4 highlights that the rib elements 5a, 5b, 5c are integrally attached to the channel wall 1c in the lower end region 2b.

It is significant in terms of the present invention that in each welding arm 3a, 3b, each of the two adjacent vacant spaces 8a, 8b lying on top of one another is open toward exactly only one of the two welding sides 6a, 6b and toward the other side is closed by a welding face 9 which connects the peripheral regions lying on top of one another and enlarges the welding zones of the latter.

It can be seen in FIGS. 1 to 4 that the upper vacant space 8a in both welding arms 3a, 3b is open toward the welding side 6b and is closed by a welding face 9 toward the welding side 6a. In contrast thereto, the lower vacant space 8b is conversely open toward the welding side 6a and closed toward the welding side 6b by a welding face 9. The embodiment in both welding arms 3a, 3b on the same welding side is thus identical. In the case of more than two vacant spaces lying below one another, the latter in the direction of the channel axis can, for example, be alternatingly closed or open toward one and toward the other welding side.

Figure 2:
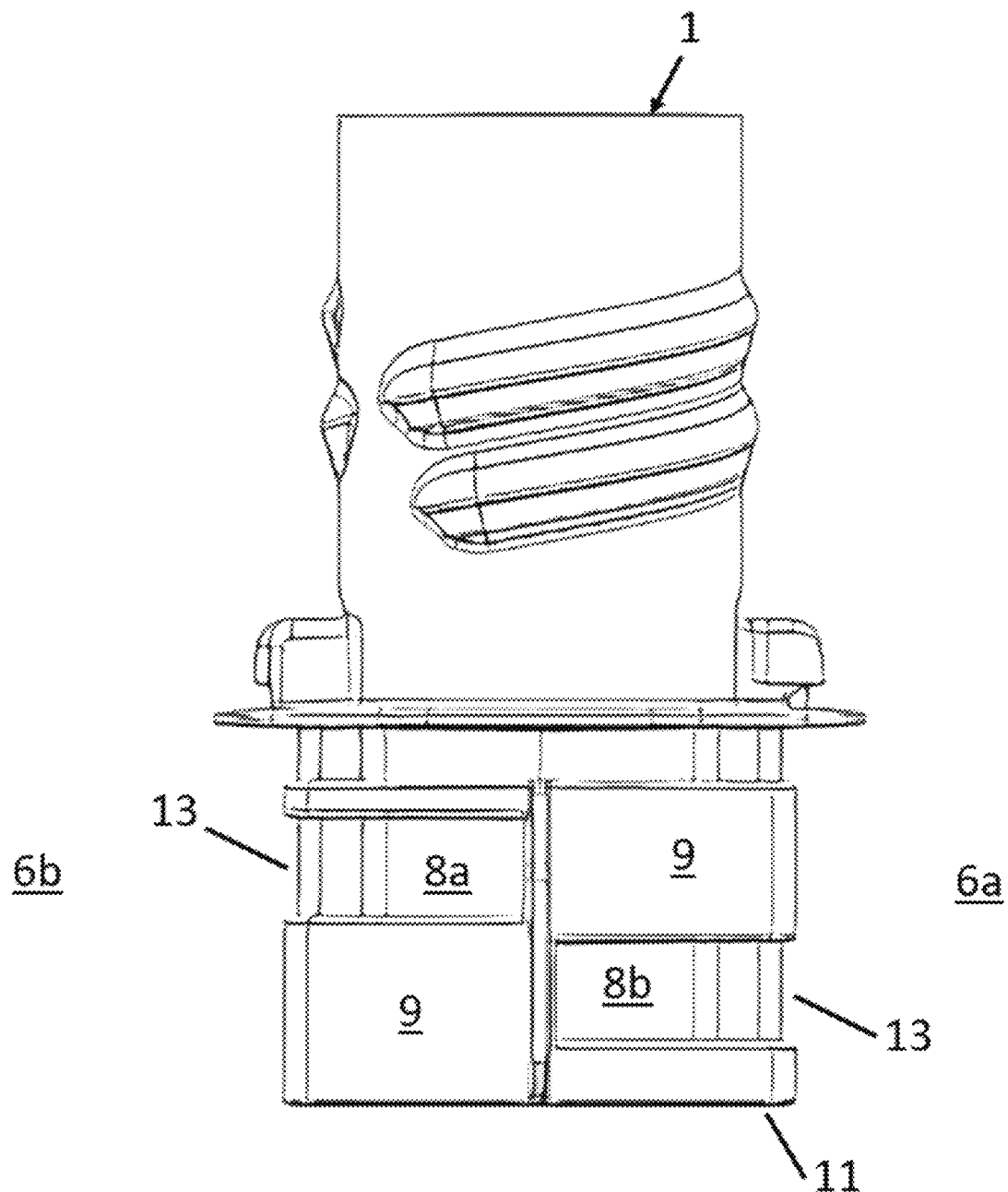
FIG. 2 shows a view onto the welding arm end and in particular highlights that the welding faces, which close the upper and lower vacant space, or the openings by way of which the vacant spaces open out toward the outside, respectively, are offset on both welding sides by the height difference between the two vacant spaces.

The view onto the welding arm end 4b in FIG. 2 in particular highlights that the welding faces 9, which close the upper and lower vacant space, or the openings by way of which the vacant spaces open out toward the outside, respectively, are offset on both welding sides, in particular specifically by the height difference between the two vacant spaces. The welding region 3 about the frontal plane is thus not mirror-symmetrical.

A mold protrusion for forming the vacant spaces 8a, 8b during injection molding for the upper vacant space 8a, with reference to FIG. 2, from the welding side 6b in the direction toward the welding side 6a, plunges into the pouring spout up to the internal wall of the upper welding face 9, and for the lower vacant space 8b from the welding side 6a in the direction toward the welding side 6b, plunges into the pouring spout up to the internal wall of the upper welding face 9. The demolding can thus take place perpendicularly to the direction of spacing of the welding arm ends 4a, 4b.

The respective vacant space 8a, 8b on the inside is continuous without interruption from the welding face 9 to the opposite opening, and can, for example, widen in this direction.

The thickness of a welding face 9, when viewed perpendicularly to the frontal plane can, for example, here be smaller than the thickness of the thickest rib element 5a, 5b, 5c when viewed in the direction of the channel axis 1b. In all potential embodiments, the term "welding face" is here, for example, not only understood to be the functional surface for the welding, but the wall element having this functional surface.

FIG. 3 shows a meandering profile in the sequence of rib elements 5a, 5b, 5c and welding faces 9 which is created by the offset of the welding faces 9 or of the openings of the vacant spaces 8a, 8b toward the outside. The meandering profile would continue in the case of more than the two vacant spaces 8a, 8b shown.

It can be clearly seen in FIG. 3 that there is no wall about the centric frontal plane. The reinforcement of the rib elements 5a, 5b, 5c in the direction of the channel axis 1b takes place alternatingly on the outside by way of the outer welding faces 9, thereby having the effect of enlarging the welding zones.

The radially projecting collar shown about the channel wall 1a, which can serve as a stop for a cap and supports functional elements of an originality protection, can, for example, be disposed between the end regions 2a and 2b.

In terms of the first embodiment of FIGS. 1 to 4, it is furthermore specific that on each of the two welding sides the respective open vacant spaces, for example, the vacant spaces 8a on the welding side 6b across the shell face region 12, which connects the two welding arms 3a, 3b, transition into one another by way of a groove 13.

The vacant spaces 8a, 8b in the plane of the opening toward the outside can furthermore, for example, have the same height everywhere.

It is furthermore specific in terms of this embodiment that the lowermost rib element has a downward-projecting collar 11 which in particular also serves as a downward enlargement of the welding zone and/or by virtue of higher resilience keeps away stress from the film at this location. Such a collar 11 can also be dispensed with in other embodiments.

Figure 5:
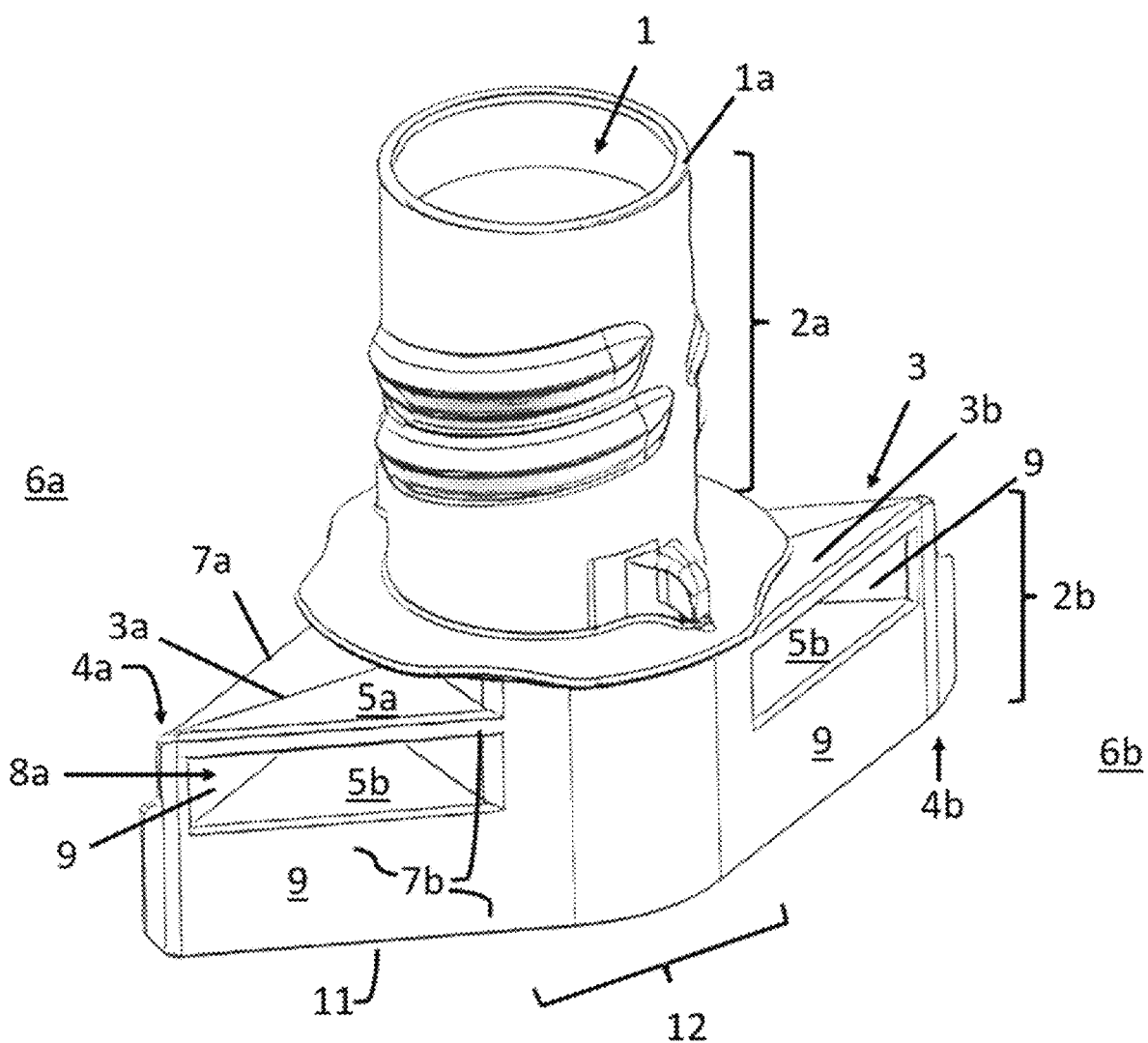
FIG. 5 shows a second embodiment of the present invention in which the groove is absent, the other features being identical.
Figure 6:
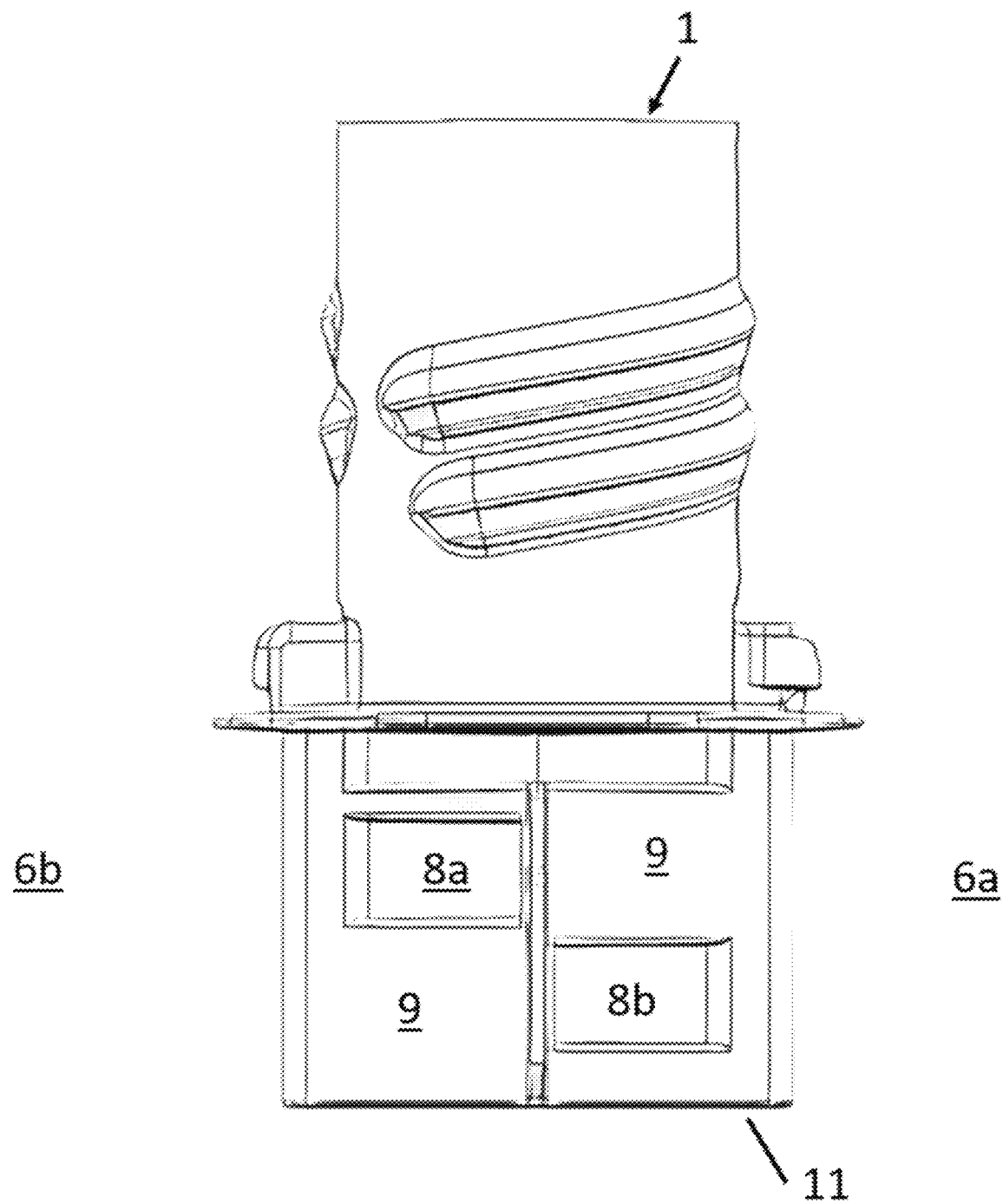
FIG. 6 shows the second embodiment of the present invention in which the groove is absent, the other features being identical.

In contrast, FIGS. 5 and 6 show a second embodiment according to the present invention in which the groove 13 is absent, while the other features are identical. The shell face region 12 in the height of the openings of the vacant spaces has the same curved profile as in the height of the welding faces which on the same welding side close the other vacant spaces.

Figure 7:
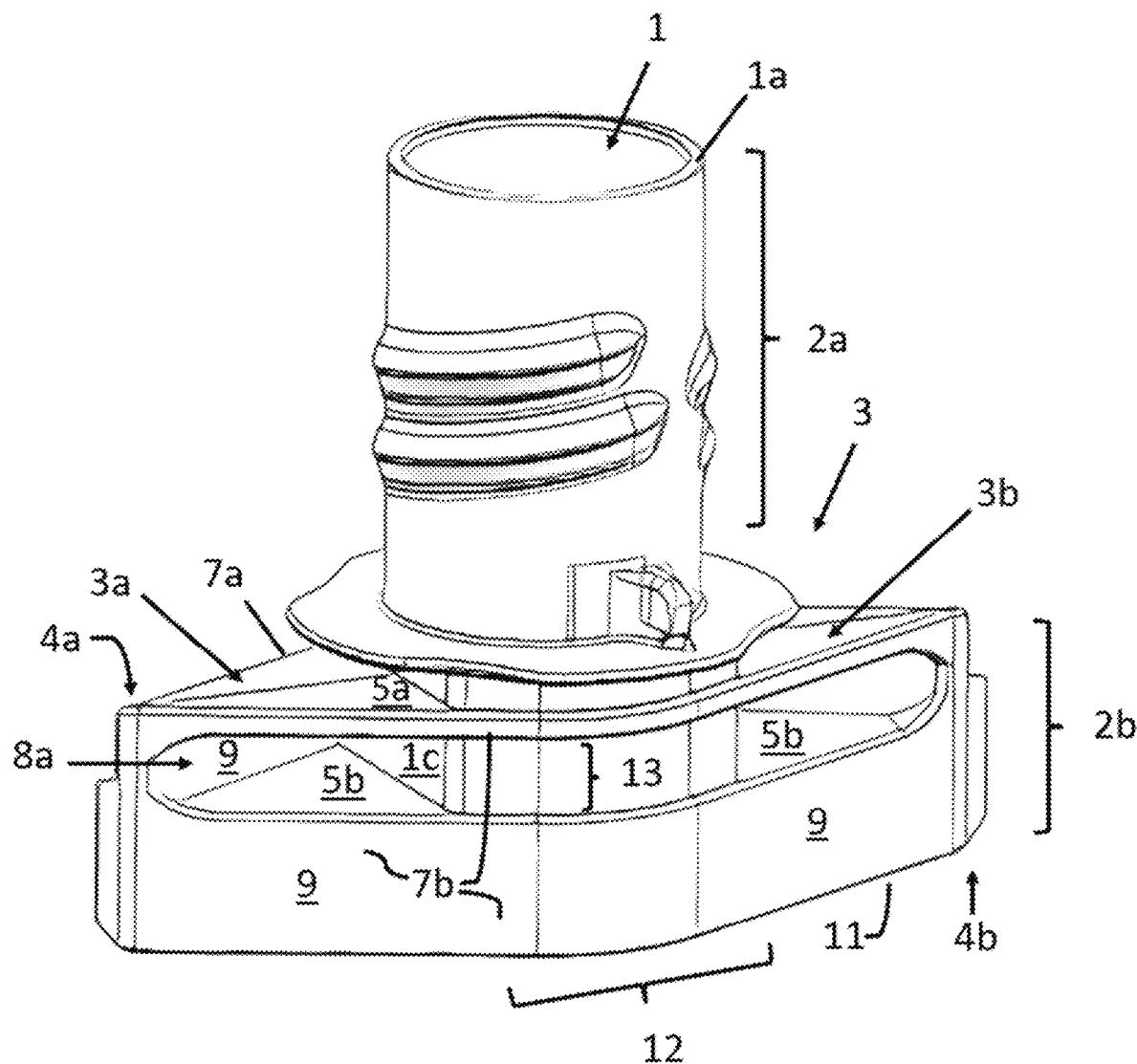
FIG. 7 shows a third embodiment of the present invention having features which are otherwise identical to those in FIGS. 1-4, which can, however, also be configured without a groove and in which it is specific that the thickness of the rib elements, or the height of the vacant spaces, decreases in the direction toward the welding arm ends.
Figure 8:
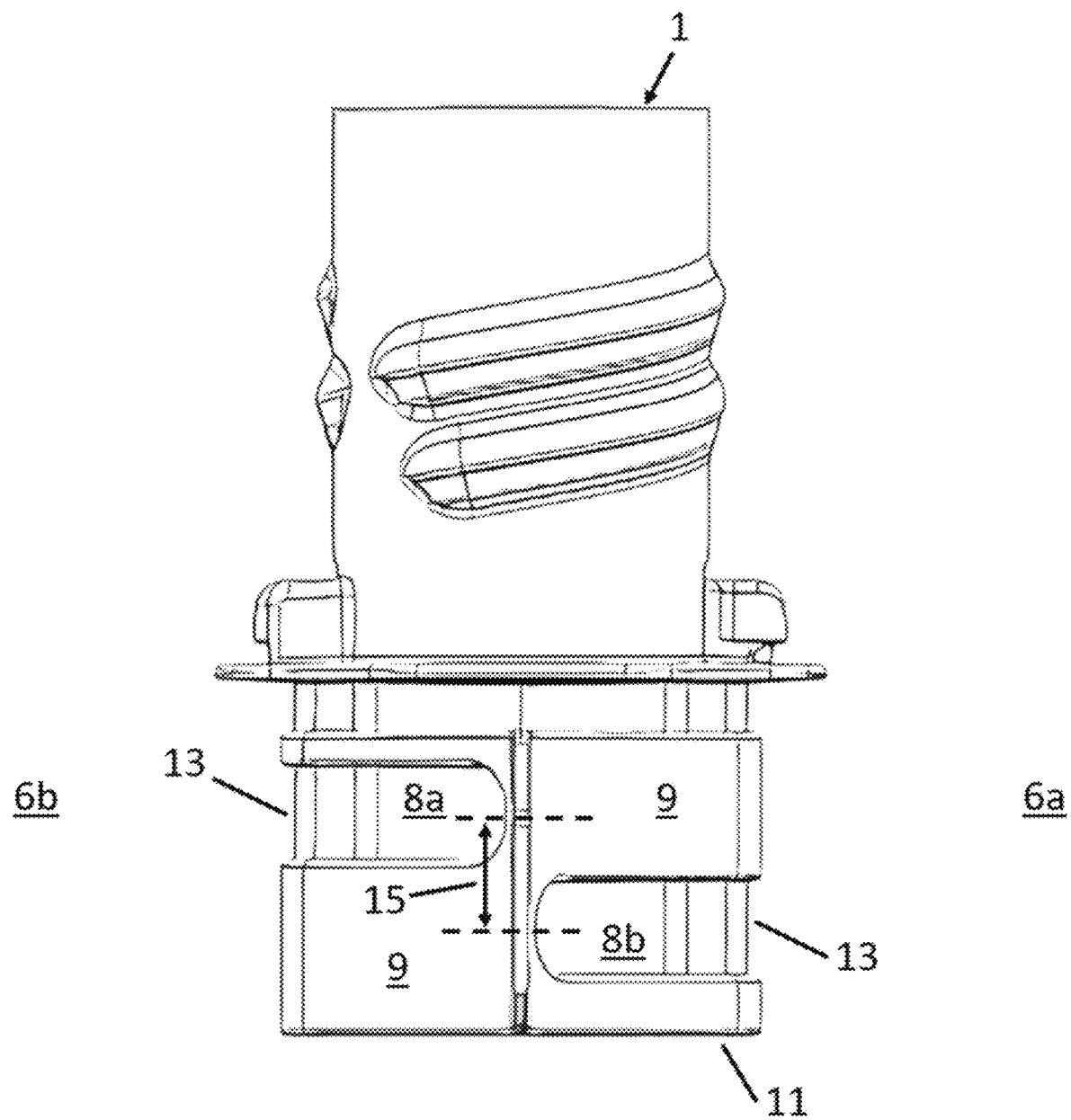
FIG. 8 shows a third embodiment and in particular shows that the effectively available face for welding enlarges in the direction toward the welding arm ends, in particular as a result of which, in the projection perpendicular to the frontal plane, an enlarged overlap of the mutually opposite welding faces on the two welding sides in comparison to the other embodiments results.

FIGS. 7 and 8 show a third embodiment having otherwise identical features as in FIGS. 1 to 4 which, while each having a groove 13, can alternatively also be configured without the groove 13, and in which it is specific that the thickness of the rib elements 5a, 5b, 5c, or the height of the vacant spaces 8a, 8b, decreases in the direction toward the welding arm ends 4a, 4b.

FIG. 8 in particular shows that in this embodiment, the effectively available face for welding enlarges in the direction toward the welding arm ends 4a, 4b, in particular as a result of which, in the projection perpendicular to the frontal plane, an enlarged overlap 15 of the mutually opposite welding faces 9 on the two welding sides 6a, 6b in comparison to the other embodiments results.

Figure 9:
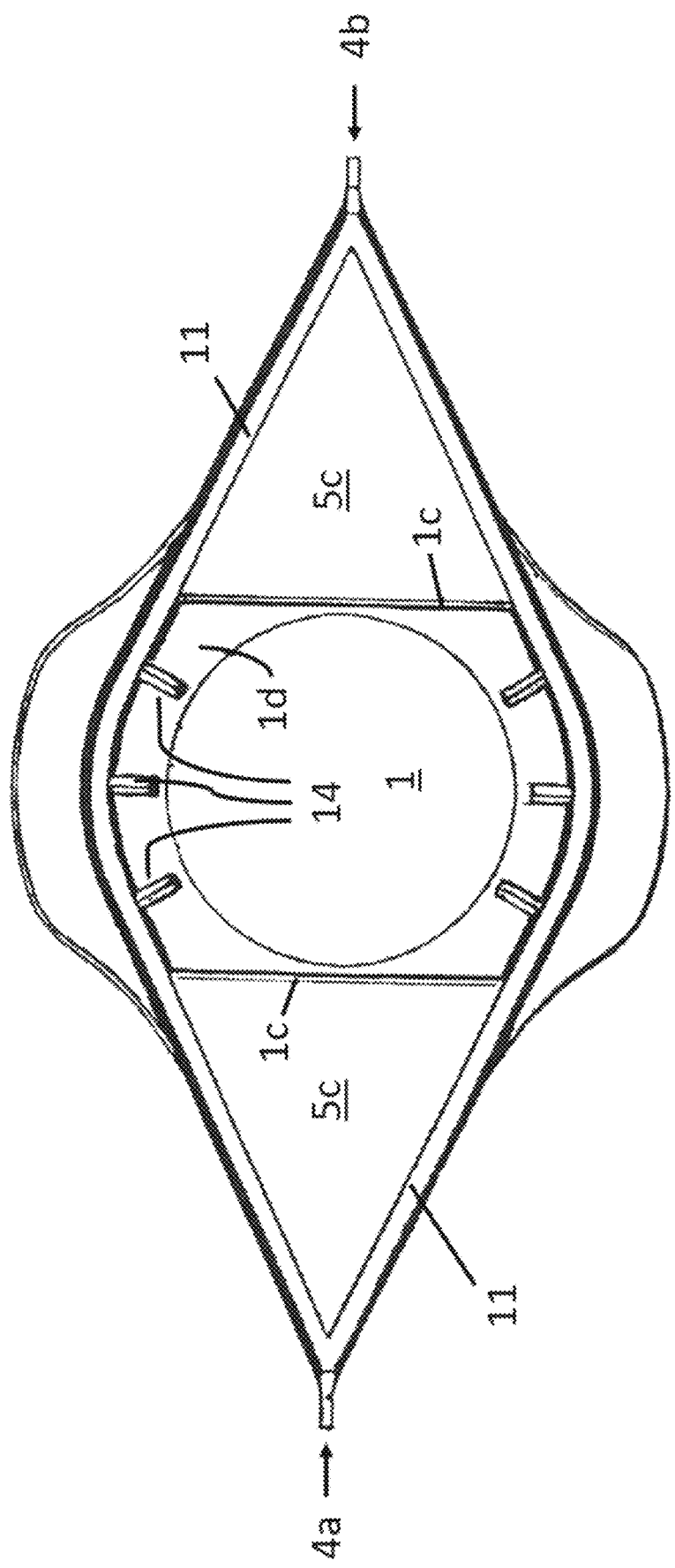
FIG. 9 shows a lower view of the pouring spout which is common to the preceding embodiments having a collar, and from which it is derived that the channel wall of the pouring channel in the lower end region has two planar/flat walls which lie mutually opposite in parallel and to which the rib elements are attached, of which the lowermost is shown.

FIG. 9 shows a lower view of the pouring spout which is common to the preceding embodiments having a collar 11 and from which it is derived that the channel wall of the pouring channel in the lower end region 2b has two planar/flat walls 1c which lie mutually opposite in parallel and to which the rib elements are attached, of which the lowermost 5c can here be seen.

Reinforcement ribs 14 point radially inward toward the channel axis 1b in the region of the channel wall 1a between the planar/flat walls 1c.

It can furthermore be seen that the pouring channel 1 at a step 1d, which is at the height level of the collar having the originality protection function, transitions from a cylindrical internal shape to the shape having the planar parallel walls 1c. It is to be noted, however, that the present invention in all potential embodiments is not restricted to the internal shape of the pouring channel 1 shown.

Figure 10:
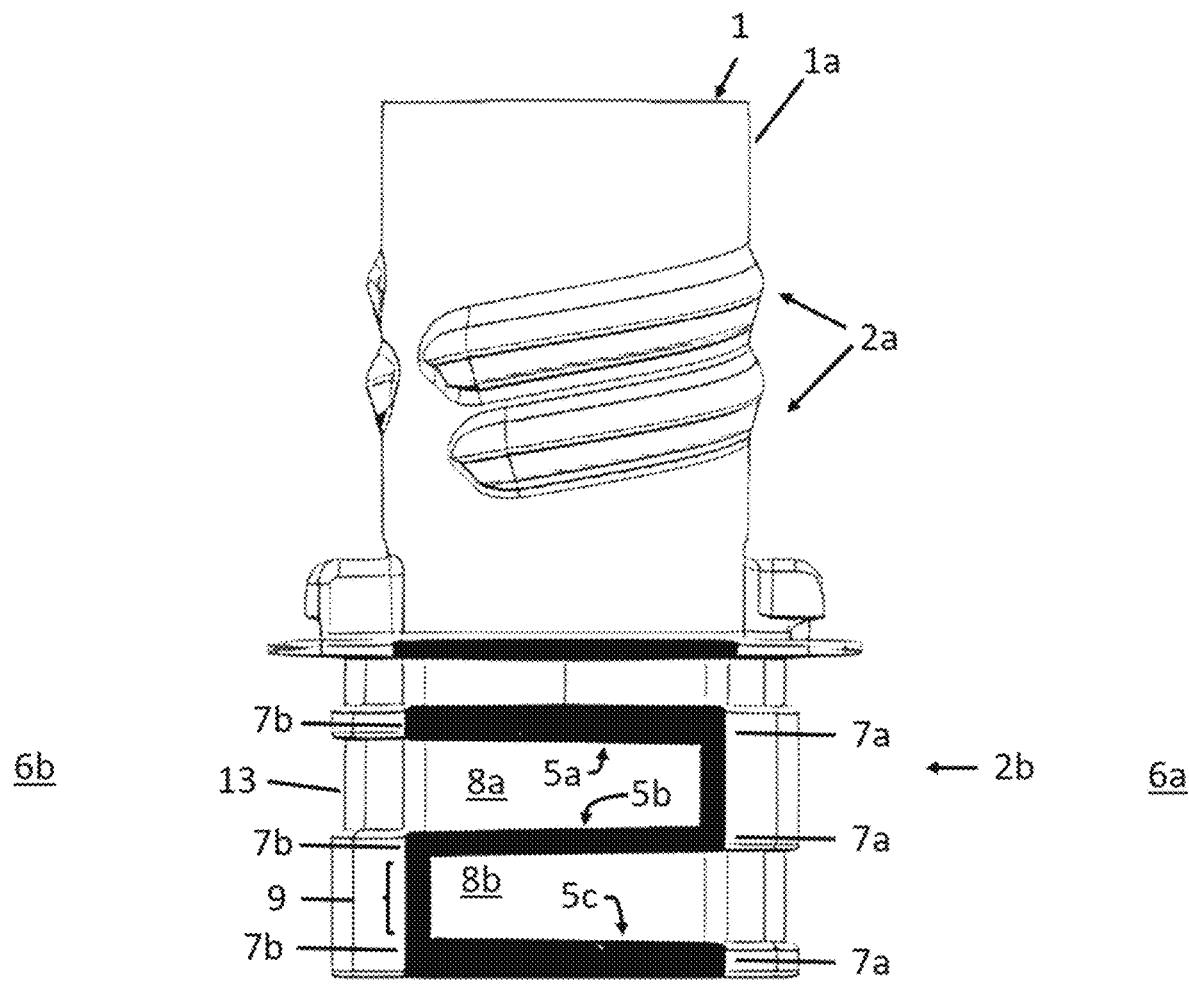
FIG. 10 shows a view of an embodiment in which the collar is not present and where the welding region toward the bottom terminates via the lower face of the lowermost rib element.
Figure 11:
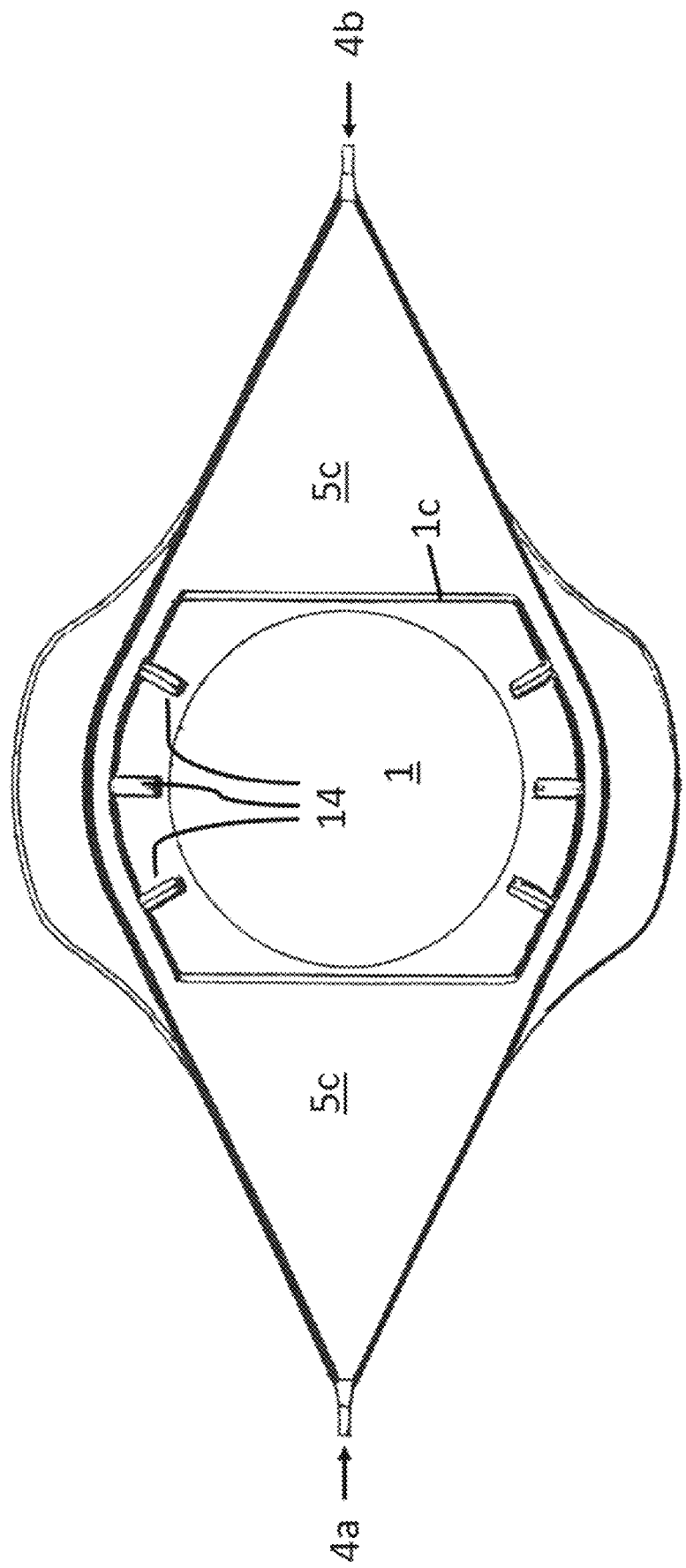
FIG. 11 shows a view of an embodiment in which the collar is not present and where the welding region toward the bottom terminates via the lower face of the lowermost rib element.

FIGS. 10 and 11 show views of an embodiment in which the collar 11 described above is not present. In this embodiment, the welding region 3 toward the bottom terminates by way of the lower face of the lowermost rib element 5c. All other features described above can otherwise also be implemented in this embodiment, in particular having a groove 13 as is shown here, or else without a groove 13.

All drawings show embodiments in which the peripheral regions 7a, 7b of the rib elements 5a, 5b that serve as welding zones, and/or the welding faces 9 that close the vacant spaces 8a, 8b, which can, for example, be disposed so as to be mutually aligned, extend in a rectilinear manner at least in regions in the extent toward the welding arm end 4a, 4b, in particular between the respective arm end 4a, 4b and the curved shell face region 12.

In the region between the attachments of the rib elements 5a, 5b to the two channel walls 1c of the second end region 2b, the welding zones, optionally enlarged by the vacant space-closing welding faces 9 by the mentioned shell face region 12, which is curved so as to be convex toward the outside, transition into one another, for example, continually.

For all embodiments according to the present invention shown, and generally for all potential embodiments according to the present invention not shown, the present invention can also provide that the peripheral regions 7a, 7b, in particular including the vacant space-closing welding faces 9, are configured with a curved profile, in particular between the welding arm ends 4a, 4b and the shell face regions 12 which are curved so as to be convex toward the outside.

For example, the mutually aligned welding faces 9 and peripheral regions 7a, 7b at least in regions, in particular at least in the region extending from the shell face region 12 of the second end region 2b to the welding arm end 4a, 4b, can have a curvature which runs in a plane perpendicular to the channel axis 1b and be configured so as to be concave toward the outside, in particular wherein this curvature transitions into the shell face regions 12 which conversely are curved so as to be convex toward the outside.

Figure 12:
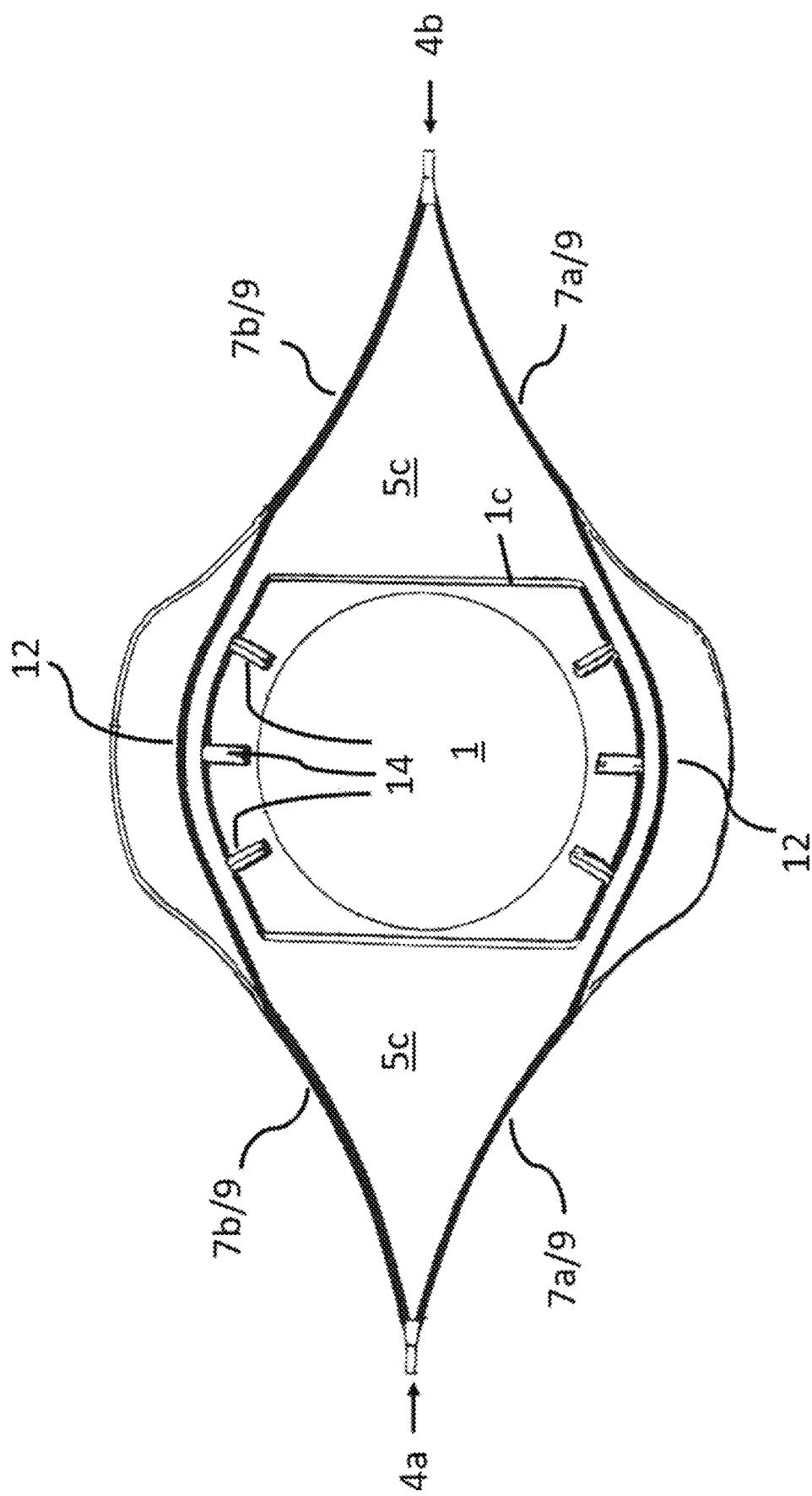
FIG. 12 shows an axial view from below onto a pouring spout without a collar.

FIG. 12 shows an axial view from below onto a pouring spout a configuration of an embodiment without a collar 11. This configuration can, however, also be provided in an embodiment with a collar 11, this likewise applying to the drawings hereunder.

In contrast, FIG. 13, which shows an axial view from below onto a pouring spout, shows an embodiment in which the mutually aligned welding faces 9 and peripheral regions 7a, 7b at least in regions, in particular at least in the region which extends from the shell face region 12 of the second end region 2b to the welding arm end 4a, 4b, have a curvature which runs in a plane perpendicular to the channel axis 1b and is configured so as to be convex toward the outside, in particular wherein this curvature transitions to the shell face regions 12 which are curved so as to be convex toward the outside.

Figure 14:
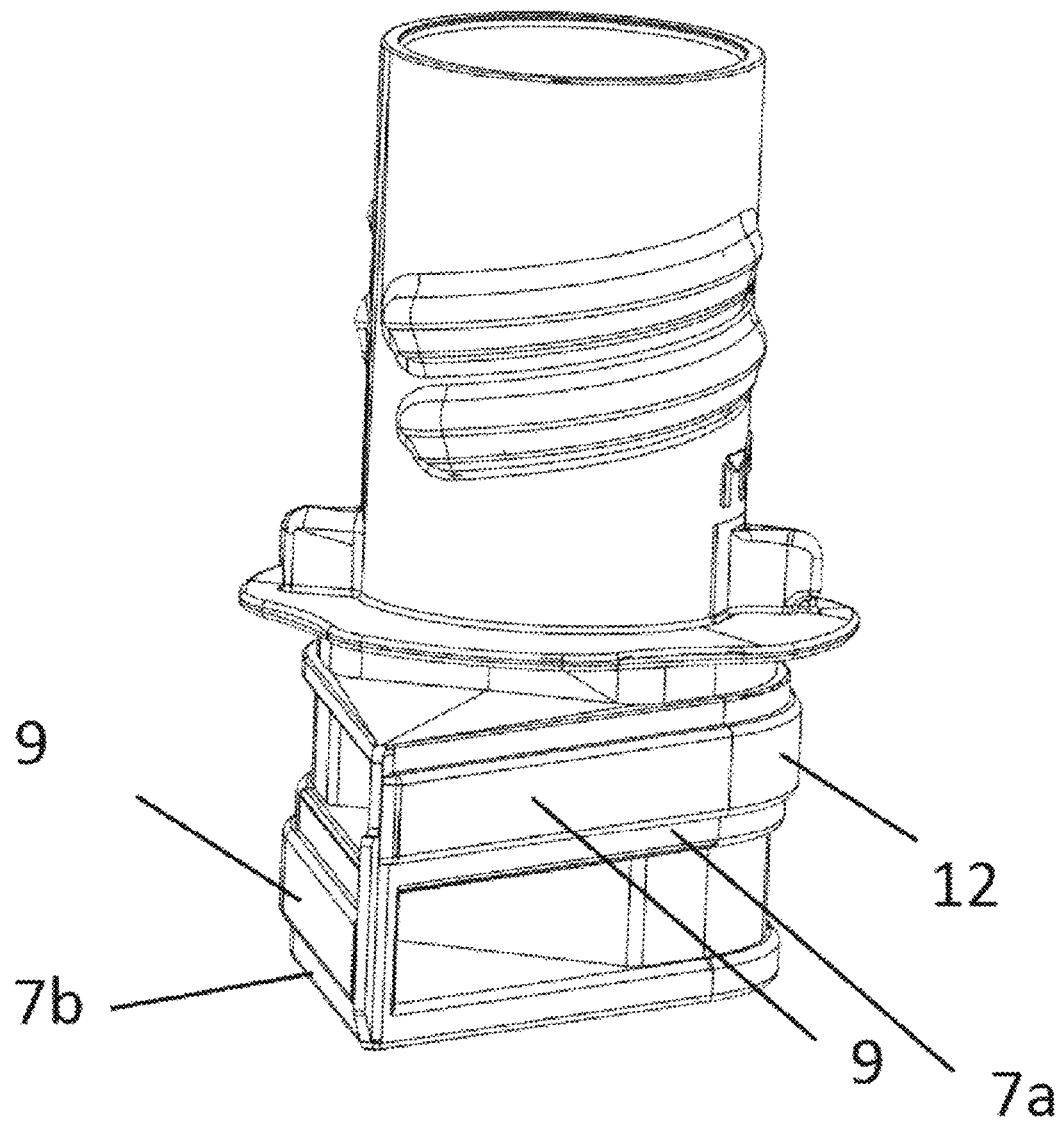
FIG. 14 shows an embodiment in which the welding faces are disposed so as to project outward in relation to the peripheral regions.
Figure 15:
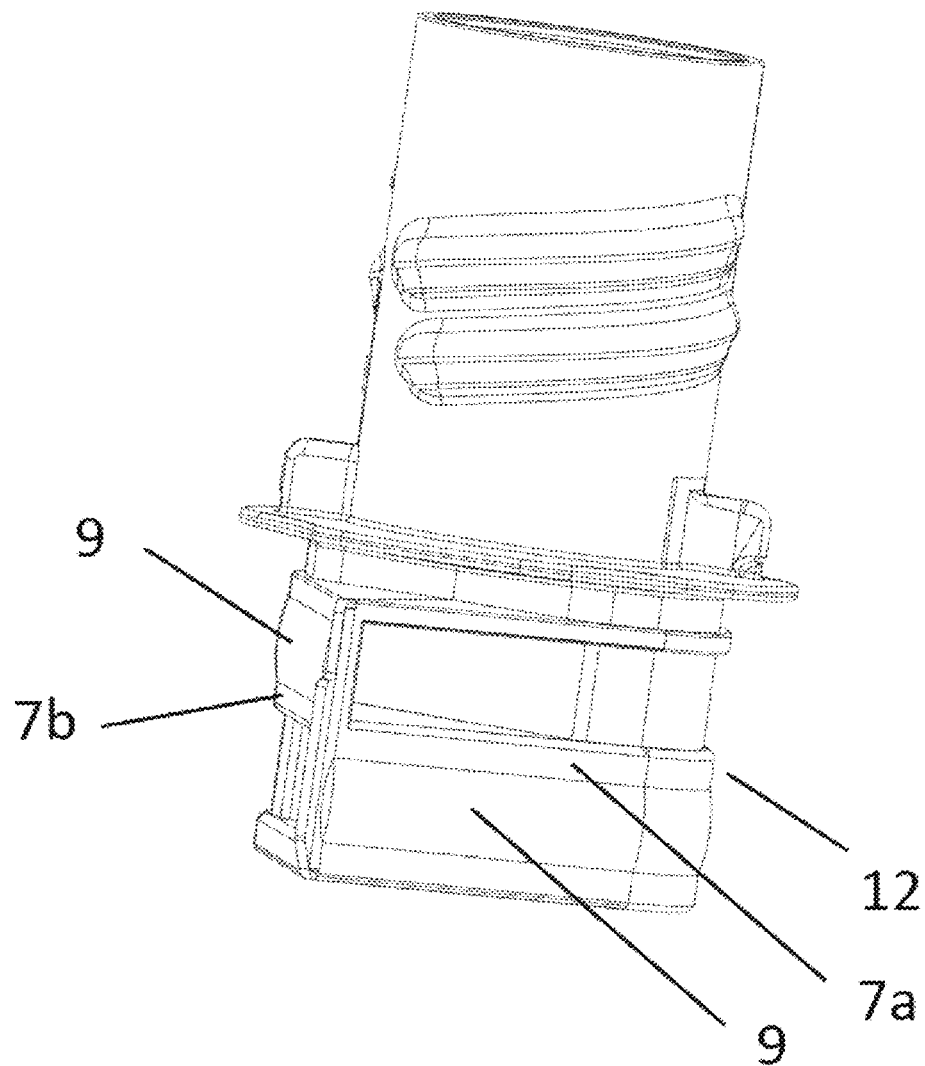
FIG. 15 shows an embodiment in which the welding faces are disposed so as to project outward in relation to the peripheral regions.

FIGS. 14 and 15 show in each case an embodiment in which the welding faces 9 are disposed so as to project outward in relation to the peripheral regions 7a, 7b.

The welding face 9 in FIG. 14 has a planar surface, wherein the welding face 9 in FIG. 15 is curved toward the outside, in particular is convex toward the outside. The curvature is present in a plane which is oriented so as to be perpendicular to the peripheral regions 7a, 7b which extend in a rectilinear manner. The curvature here runs in the direction of the spacing of the peripheral regions 7a, 7b.

Figure 13:
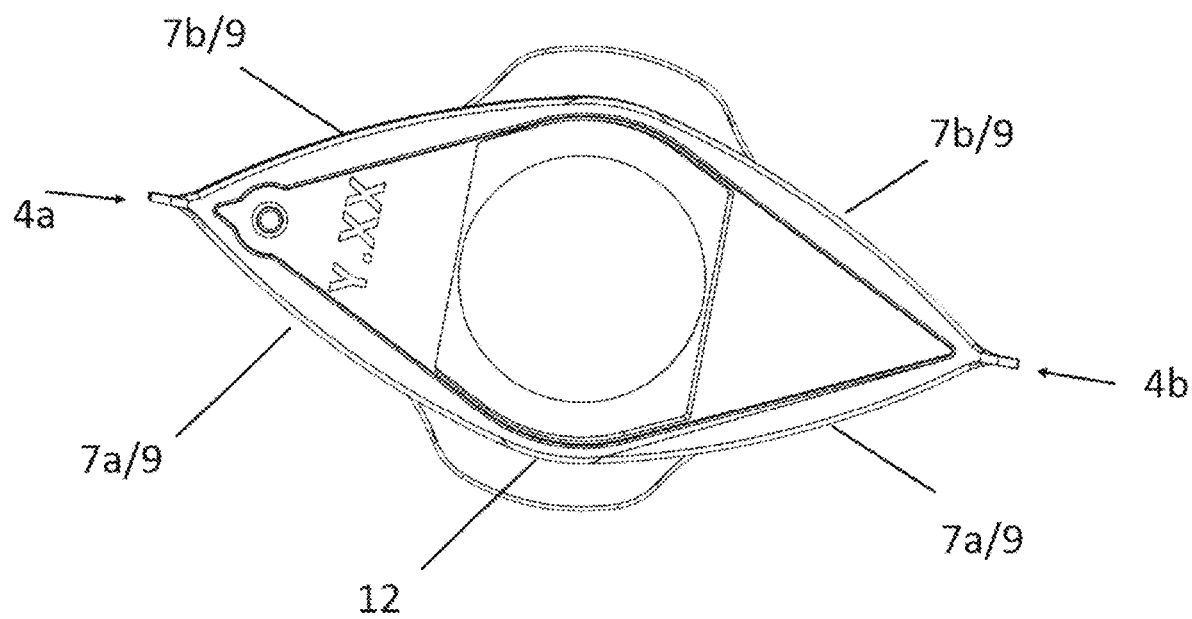
FIG. 13 shows an axial view from below onto a pouring spout in which the mutually aligned welding faces and peripheral regions at least in regions, in particular at least in the region which extends from the shell face region of the second end region to the welding arm end, have a curvature which runs in a plane perpendicular to the channel axis and is configured so as to be convex toward the outside, in particular wherein this curvature transitions to the shell face regions which are curved so as to be convex toward the outside.

It is to be noted that the embodiments of FIGS. 14 and 15 can also be combined with the embodiments of FIGS. 12 and 13.

The present invention is not limited to embodiments described herein; reference should be had to the appended claims.

LIST OF REFERENCE NUMERALS 1 pouring channel
1a channel wall
1b channel axis
1c planer/flat wall
1d step
2a upper end region
2b lower end region
3 welding region
3a welding arm
3b welding arm
4a welding arm end
4b welding arm end
5a rib element
5b rib element
5c rib element
6a welding side for film layer of a film bag
6b welding side for film layer of a film bag
7a peripheral region
7b peripheral region
8a vacant space
8b vacant space
9 welding face
10a traversal plane
10b traversal plane
10c traversal plane
11 downward projecting collar
12 shell face region
13 groove
14 reinforcement ribs
15 enlarged overlap

What is claimed is:

1. A pouring spout for a film bag, the pouring spout comprising:
   a welding region; and
   a pouring channel which comprises:
      a channel axis,
      a first end region,
      a second end region, and
      a channel wall which is configured as a pouring nozzle at the first end region and which is surrounded by the welding region at the second end region, wherein,
   the welding region comprises a first welding arm and a second welding arm which are arranged to extend in opposite directions perpendicular to the channel axis of the pouring channel and away from the channel wall to a first welding arm end and to a second welding arm end, respectively,
   each of the first welding arm and the second welding arm comprises a plurality of rib elements which are attached to the channel wall and which are mutually axially spaced apart from each other with respect to the channel axis,
   each of the plurality of rib elements comprises two welding sides which comprises a first welding side and a second welding side, the first welding side having a first peripheral region which extends between the channel wall and the first welding arm end, and the second welding side having a second peripheral region which extends between the channel wall and the second welding arm end,
   the first peripheral region and the second peripheral region each form a first welding zone and a second welding zone which converge towards the first welding arm end and the second welding arm end, respectively,
   vacant spaces arranged in the first welding arm and the second welding arm between each of two adjacent rib elements of the plurality of rib elements, each of the vacant spaces being open on one of the two welding sides and being closed by a welding face on the other of the two welding sides, and
   each of the first welding arm and the second welding arm has at least one vacant space which is open on the first welding side and which is closed on the second welding side, and at least one vacant space which is closed on the first welding side and which is open on the second welding side.

2. The pouring spout as recited in claim 1, wherein each of the first welding arm and the second welding arm has exactly one vacant space which is open on the first welding side and which is closed on the second welding side, and exactly one vacant space which is closed on the first welding side and which is open on the second welding side.

3. The pouring spout as recited in claim 1, wherein the vacant spaces which are axially adjacent to each other with respect to the channel axis are arranged to alternatingly be closed or open toward the first welding side and toward the second welding side.

4. The pouring spout as recited in claim 3, wherein the plurality of rib elements and the welding faces that close a vacant space have a meandering profile when viewed in a section plane through the first welding arm or through the second welding arm perpendicular to a direction of a spacing of the first welding arm end and the second welding arm end.

5. The pouring spout as recited in claim 1, wherein,
   the welding face has a wall thickness,
   each of the plurality of rib elements has a wall thickness, and
   the wall thickness of the welding face is less than or equal to the wall thickness of the rib elements of the plurality of rib elements which is adjacent thereto.

6. The pouring spout as recited in claim 1, wherein a vacant space which is closed by the welding face on the first welding side and which is open on the second welding side widens in a direction towards the second welding side.

7. The pouring spout as recited in claim 1, wherein each of the plurality of rib elements is arranged about a transversal plane which is perpendicular to the channel axis.

8. The pouring spout as recited in claim 7, wherein,
   each of the plurality of rib elements comprises a face towards a vacant space, and each face is inclined with respect to the transversal plane about which the respective rib element of the plurality of rib elements is arranged.

9. The pouring spout as recited in claim 1, wherein,
the pouring channel further comprises an end in the second end region which is opposite to the first end region,
a collar is configured on the rib element of the plurality of rib elements that is closest to the end, and
the collar is arranged to enlarge each of the first peripheral region, the second peripheral region, the first welding zone, and the second welding zone of the rib element and to point away from the rib element.

10. The pouring spout as recited in claim 1, wherein at least one of,
a thickness of at least one the plurality of rib elements, when viewed from a direction of the channel axis, increases towards the first welding arm end and the second welding arm end, and
a height of a vacant space, when viewed from the direction of the channel axis, decreases between two adjacent rib elements of the plurality of rib elements.

11. The pouring spout as recited in claim 1, wherein,
the pouring channel further comprises two planer walls which are arranged in the welding region of the pouring channel to be mutually parallel with respect to each other and to lie mutually opposite about the channel axis, and
each of the plurality of rib elements are attached to one of the two planer walls.

12. The pouring spout as recited in claim 11, wherein the pouring channel, in the welding region between the two planer walls, further comprises a plurality of reinforcement ribs which extend from an inside of the pouring channel radially inward.

13. The pouring spout as recited in claim 1, wherein the vacant spaces which, in terms of a position thereof when viewed in a direction of the channel axis, are identically arranged in each of the first welding arm and in the second welding arm, and close or open towards either the first welding side or the second welding side.

14. The pouring spout as recited in claim 13, wherein,
the second end region has a shell face region which extends between the first welding arm and the second welding arm, and
the vacant spaces which, in terms of the position thereof when viewed in the direction of the channel axis, are identically arranged in each of the first welding arm and in the second welding arm, are connected by a groove across the shell face region.

15. The pouring spout as recited in claim 14, wherein the groove has a height, as measured in the direction of the channel axis, which corresponds to a height of the vacant spaces, as measured in the direction of the channel axis.

16. The pouring spout as recited in claim 14, wherein the welding faces that close a vacant space are arranged to project outward in relation to at least one of the first peripheral region and the second peripheral region of the plurality of rib elements that is contiguous to the welding faces.

17. The pouring spout as recited in claim 16, wherein the welding faces which are arranged to project outward project outward at least in a region which extends from the shell face region to the first welding arm end and the second welding arm end, respectively, and
are arranged to be planar, or
are arranged to have an outwardly bulging curvature which runs in a direction of a spacing of the first peripheral region and the second peripheral region.

18. The pouring spout as recited in claim 14, wherein the welding faces that close a vacant space are arranged to be aligned with at least one of the first peripheral region and the second peripheral region of the plurality of rib elements that is contiguous to the welding faces.

19. The pouring spout as recited in claim 18, wherein the welding faces, the first peripheral region, and the second peripheral region, at least in a region which extends from the shell face region to the first welding arm end and the second welding arm end,
are arranged to be planar, or
are arranged to have a curvature which runs in a plane perpendicular to the channel axis and to be concave toward an outside or convex toward the outside.

* * * * *